Nov. 11, 1958

T. F. SARAH 2,859,924

FREE SPOOL FISHING REEL

Filed Sept. 30, 1955

INVENTOR.
THOMAS F. SARAH
BY *Ely, Frye & Hamilton*
ATTORNEYS

Nov. 11, 1958  T. F. SARAH  2,859,924
FREE SPOOL FISHING REEL
Filed Sept. 30, 1955  3 Sheets-Sheet 2

INVENTOR.
THOMAS F. SARAH
BY
ATTORNEYS

Nov. 11, 1958 T. F. SARAH 2,859,924
FREE SPOOL FISHING REEL
Filed Sept. 30, 1955 3 Sheets-Sheet 3

INVENTOR.
THOMAS F. SARAH
BY
ATTORNEYS

2,859,924
Patented Nov. 11, 1958

2,859,924

FREE SPOOL FISHING REEL

Thomas F. Sarah, Akron, Ohio, assignor to The Enterprise Manufacturing Company, Akron, Ohio, a corporation of Ohio Application September 30, 1955, Serial No. 537,619

3 Claims. (Cl. 242—84.54)

The invention relates generally to fishing reels, and more particularly to larger types of reels such as used in salt water fishing. Such reels embody clutch means for releasing the driving gear from engagement with the spool shaft to allow it to turn freely when desired, and click means for warning the fisherman when a fish is paying out the line.

The clutch means must normally produce a quiet and efficient driving connection between the driving gears and the spool, and is operated by a clutch shifting lever mounted on one of the end plates of the reel, preferably adjacent to the reel handle. The click mechanism is preferably mounted on the inside of the other end plate. In certain prior reel constructions known to me the clutch mechanisms have been relatively complicated and expensive to manufacture and assemble, and the principal object of the present invention is to simplify and improve those mechanisms.

Specifically, it is an object of the present invention to provide an improved clutch mechanism for driving and releasing the reel spool.

These and other objects are accomplished by the preferred embodiment of the improved reel shown by way of example in the accompanying drawings and hereinafter described in detail. Various modifications and changes in details of construction are included within the scope of the invention as defined in the appended claims.

Referring to the drawings.

Figure 1:
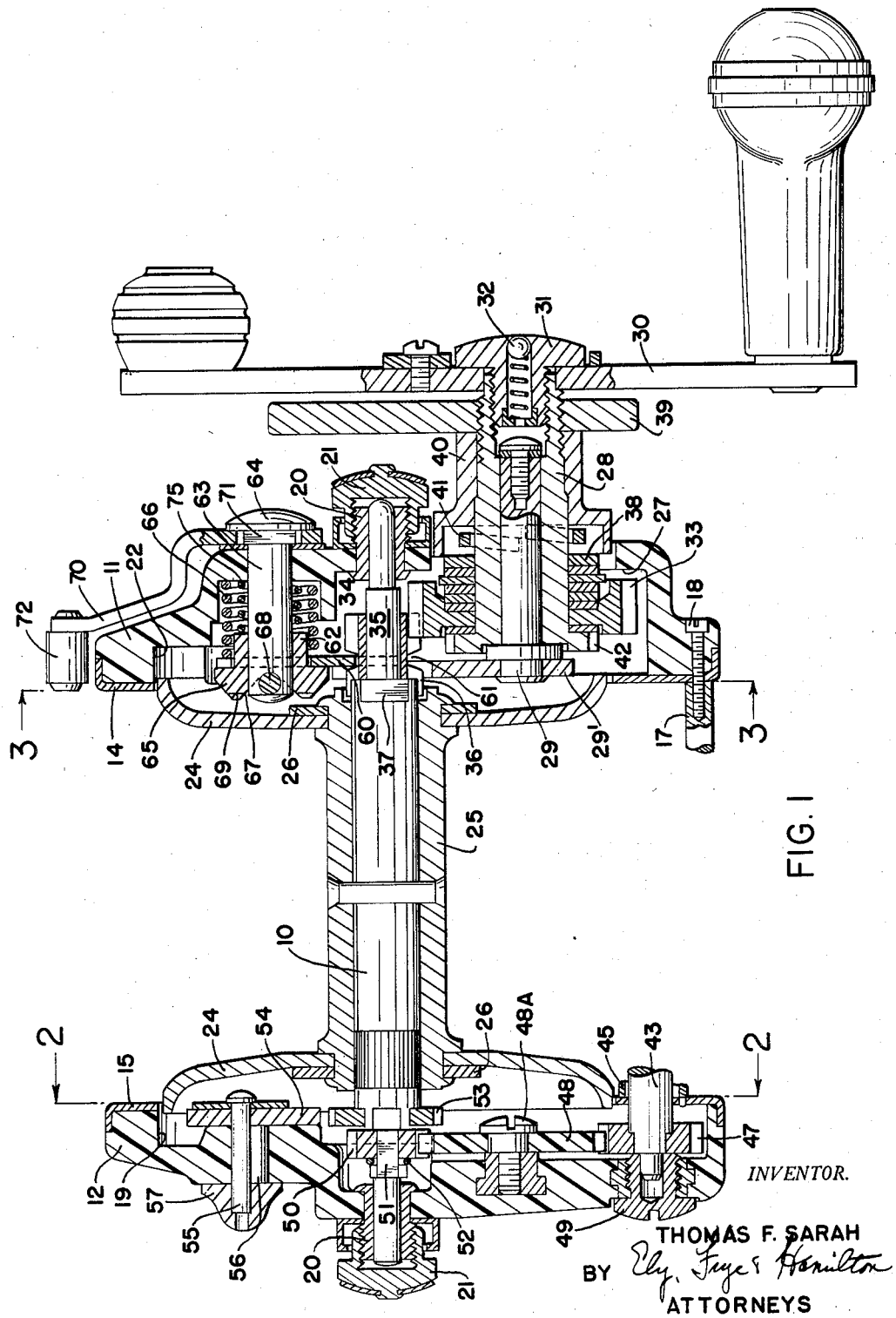
Fig. 1 is a longitudinal sectional view of the improved reel, the section through the right end plate being on line 1—1 of Fig. 6, and the section through the left end plate being on line 1—1 of Fig. 7.

Referring to Fig. 1, the reel includes a spindle or spool shaft 10 journaled in the front and back plates 11 and 12, which are connected together in spaced relation by circumferentially spaced rods or pillars 13. The plates 11 and 12 are preferably made of hard rubber, bakelite, or other similar plastic material, and have flanged metal binding rings 14 and 15, respectively, covering their inner edges. The pillars 13 abut the inner surfaces of the rings 14 and 15 and are secured to the end plates by screws 16.

Figure 2:
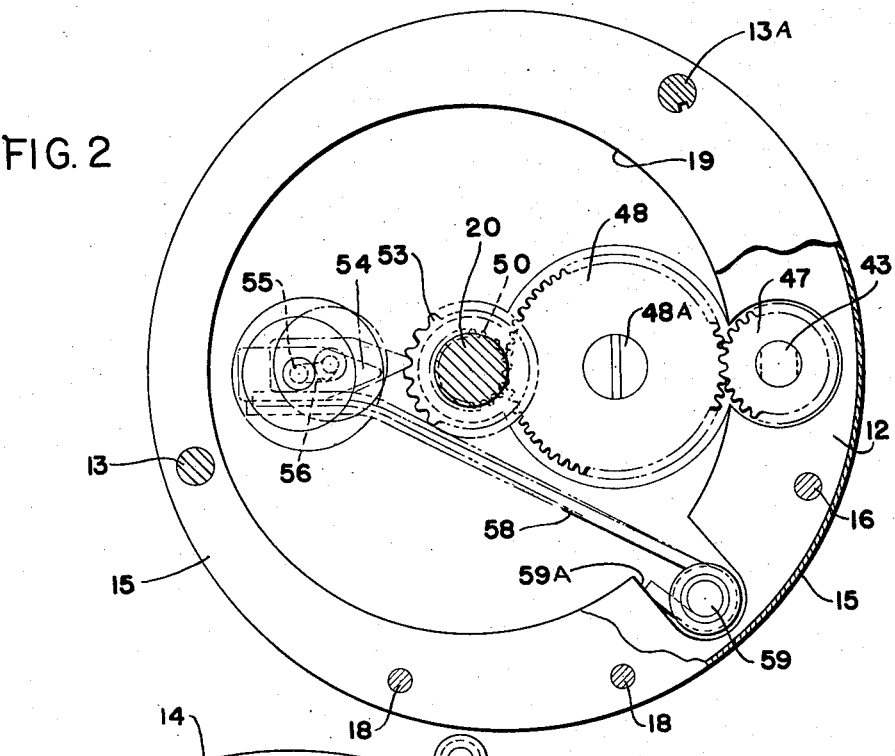
Fig. 2 is a cross sectional view on line 2—2 of Fig. 1, showing the improved click mechanism in end elevation.
Figure 3:
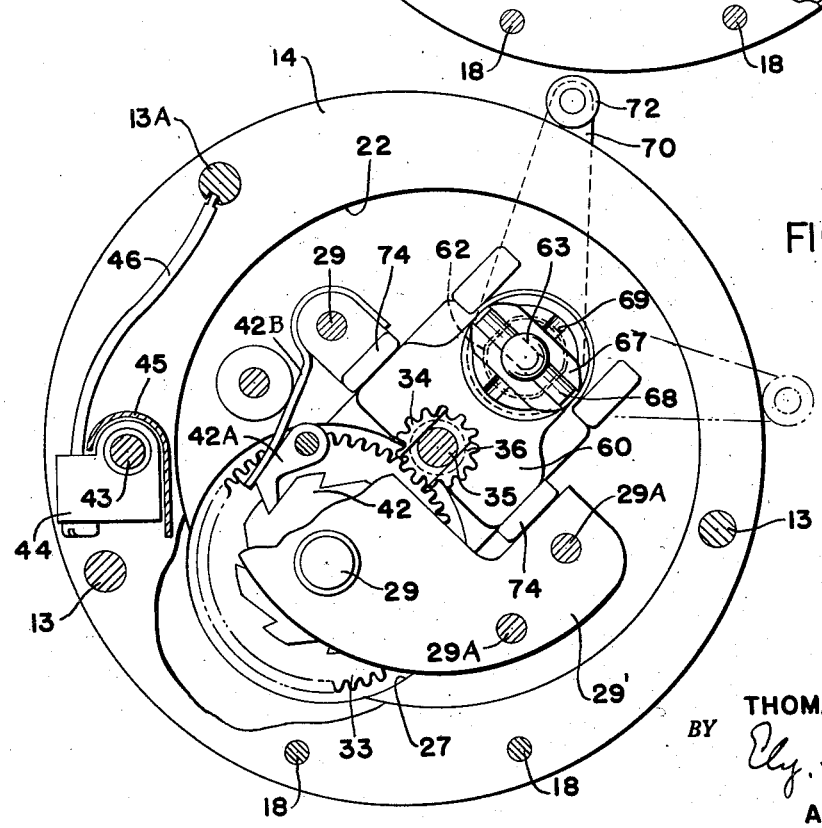
Fig. 3 is a cross sectional view on line 3—3 of Fig. 1 showing the improved clutch mechanism in end elevation.

The end plates are also connected together by a cross plate 17 secured to the end plates by screws 18. The cross plate has the usual outer contour for attachment to a fishing rod. The back plate 12 has an off center recessed portion 19 in which the click mechanism is mounted, and at the center of the portion 19 is a bearing 20 for the rear end of the spool shaft 10, said bearing preferably having a cap 21 which acts as an adjustable thrust bearing and may contain lubricant. The front plate 11 has a similar recessed portion 22 in which the clutch mechanism is housed, and another end bearing 20 and cap 21 are mounted in the outer side of the plate 11 for journaling the other end of the spool shaft 10. As shown in Figs. 2 and 3, the metal rings 14 and 15 cover the inner surfaces of the end plates 11 and 12 around the recesses 19 and 22.

The end flanges 24 of the spool are secured on the ends of the hub 25 by annular plates 26, and the outer peripheries of the spool flanges lie within the inner edges of said rings 14 and 15. Thus, the plates 11 and 12 are removable axially of the flanges 24 by removing the screws 16 and 18 from the pillars 13 and the cross plate 17.

Within the recessed portion 22 in front plate 11 is a further recessed portion 27 in which the drag mechanism is located. The drag mechanism is mounted on a hollow shaft 28 telescoped over the crankshaft post 29, and the shaft 28 extends outwardly through said plate 11. The inner end of post 29 is supported on a bridge plate 29' which has its legs secured to the end plate 11 by screws 29A. The crank handle 30 is non-rotatively mounted on the outer end of tubular shaft 28 by a nut 31 screwed into said shaft and having an axial passage for lubricant normally closed by spring-pressed ball 32.

A driving gear 33 is journaled on tubular shaft 28 and meshes with a pinion gear 34 slidable on the reduced portion 35 of shaft 10 and having an end socket or clutch element 36 normally engaging the flatted shoulder 37 on spool shaft 10. A pile of friction disks, which may be alternate metal and fiber disks, is indicated at 38. These friction disks are adjustably held in abutment with the inner annular surface of the gear 33 by a star wheel 39 screwed on the outer end of shaft 28 to adjustably force a sleeve 40 toward said disks. A spring washer 41 may be provided between the sleeve 40 and the outermost disk. Thus the gear 33 is driven from the handle 30 through the friction disks, and the amount of drag is adjustable by turning the star wheel. The drag mechanism forms no part of the present invention.

As best seen in Fig. 3, the inner end of shaft 28 is provided with a toothed ratchet wheel 42 engaged by a ratchet pawl 42A held against the teeth by a spring plate 42B. This prevents rotation of the shaft 28 in a direction to unwind the line from the spool. Also seen in Fig. 3 in cross section is a well-known level wind mechanism comprising a shaft 43 extending between the end plates. This shaft has crossed threads engaged by a pin in nut 44 to cause the nut to slide back and forth within the guard plate 45 between the end plates of the spool. A line guide 46 on the nut is slidably engaged at its outer end in the grooved pillar 13A.

One end of the level wind shaft 43 is non-rotatively engaged with a pinion gear 47 journaled in the end plate 12. As shown in Fig. 2, the pinion 47 meshes with a gear 48 journaled on a screw 48A in the end plate. The reduced end of shaft 43 is journaled in a bearing screw 49 in the end plate (Fig. 1). Gear 48 is driven by a pinion 50 held on the flatted portion 51 of spool shaft 20 by a snap ring 52.

Accordingly, rotation of the spool shaft rotates the level wind shaft 43 and moves the line guide back and forth along the spool to level wind the line thereon.

Adjacent to the pinion 50 is a click gear wheel 53 non-rotatively mounted on a flatted portion of the spool shaft 10, and the wheel 53 has rounded teeth around its outer periphery for engagement with a click pawl 54. The pawl 54 is pivotally mounted on a pin 55 which is slidable in a slot 56 in the end plate 12, so that the pawl may be moved into and out of engagement with wheel 53 by pressing on the finger button 57 on the exterior of plate 12. The inner end of the slot 56 is angularly offset, as indicated in Fig. 2, and a linear wire spring 58 urges the pin toward the offset portion of the slot. The free end of the wire spring 58 engages the side of pawl 54 and its other end is anchored around a post 59 in the end plate and bears against the wall of a recess 59a in the plate.

When the click pawl 54 is moved inwardly to the chain line position of Fig. 2, it engages the teeth of click wheel 53, and the spring 58 holds the pin 55 in the offset portion of slot 56. In this position, rotation of the spool shaft 20 in either direction will cause the pawl 54 to ratchet over the teeth by pivoting on the pin 55 against the yielding resistance of spring 58 and cause the clicking sound which warns the fisherman that the spool is rotating. This improved construction is very simple and economical and requires only a single spring 58 to yieldingly resist pivotal movement of the click pawl in either direction.

The improved clutch mechanism for shifting the pinion 34 into and out of driving engagement with the spool shaft 10 includes a yoke plate 60 having one end extending into an annular groove 61 in the pinion adjacent to the socket 36 on the end thereof. The other end of the yoke plate 60 has a flatted hole fitting slidably and non-rotatively around a cam bushing 62 journaled on a bolt 63 extending into the end plate 11 from the outer side and having a head 64 thereon. The cam bushing has an annular shoulder 65 against which the plate 60 is held in abutment by a helical spring 66 bearing against the inside of end plate 11.

Figure 4:
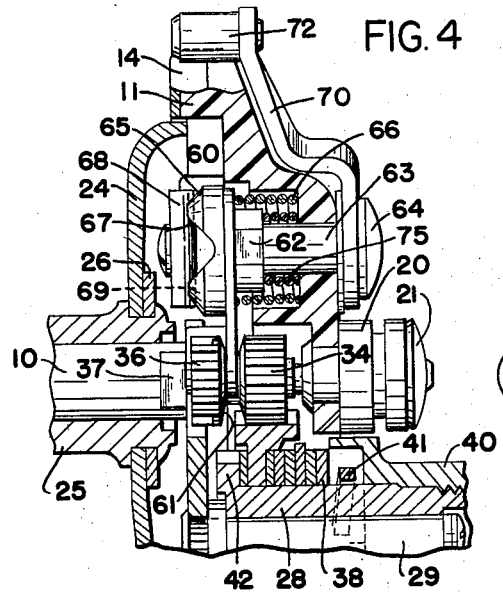
Fig. 4 is a fragmentary view similar to Fig. 1, showing the clutch released from the spool shaft.

The inner end of the cam bushing 62 is provided with a transverse V-shaped slot 67 adapted to receive a transverse pin 68 slidably fitted in the inner end of the bolt 63 when the socket 36 of pinion 34 is in driving engagement with the spool shaft, as shown in Fig. 1. A shallow transverse slot 69 is formed in the outer edges of slot 67, and at right angles thereto, for receiving the pin 68 when the driving pinion 34 is disengaged from the spool shaft, as shown in Fig. 4. A clutch lever 70 for rotating the bolt 63 has a flatted hole non-rotatively fitting the flatted portion 71 on the bolt, and is provided at its outer end with a stop pin 72 which engages the rim of end plate 11 to limit movement of the lever in either direction.

Figure 5:
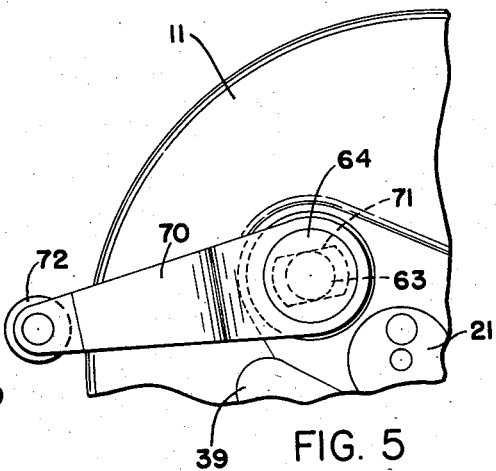
Fig. 5 is a fragmentary end elevation of the reel, showing the clutch lever in clutch-releasing position.
Figure 6:
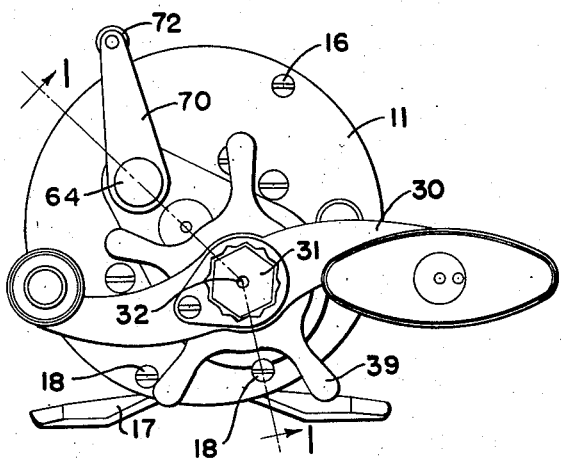
Fig. 6 is a full end elevation on a reduced scale, showing the clutch lever in clutch-engaging position.
Figure 7:
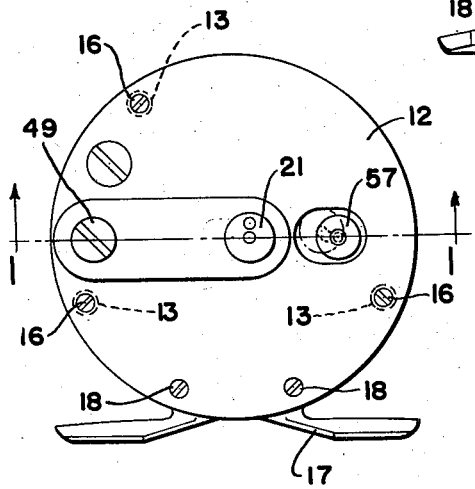
Fig. 7 is an elevation of the opposite end of the reel.

As the lever 70 is rotated from the position of Figs. 4 and 5 to the position of Figs. 1 and 6, the pin 68 is rotated out of the shallow slot 69 and slides over the edges of slot 67 into registry therewith, and the cam bushing is forced inwardly by the spring 66 to move the socket 36 of pinion 34 into driving engagement with the flatted portion 37 of the spool shaft. When the bolt 63 is rotated, the bushing 62 and yoke plate 60 are held against rotation by projecting lugs 74 on the end plate 11 engaging the sides of plate 60.

A second spring 75 is preferably provided within the spring 66 in abutment with bushing 62 to more positively urge the bushing inwardly when the pin 68 registers with slot 67. The spring 75 insures against the pin 68 becoming loose in the slot 67 due to momentary non-meshing of the socket 36 with the spool shaft, in which case pin 68 might drop out of the bolt 63.

The pin 68 preferably has a central portion of reduced diameter which normally engages the transverse hole in the end of bolt 63 under pressure of the springs 66 and 75, so as to normally keep the pin in the hole as the bolt is rotated to operate the clutch.

The clutch mechanism is entirely contained in the end plate 11, and the end plate assembly is quickly removable from the spool merely by removing the screws 16 and 18. Once the end plate assembly is thus removed, the clutch mechanism is easily removed without the aid of any tools, merely by pressing on the cam bushing 62 to relieve the spring pressure on the pin 68 and removing the pin with the fingers. After the pin is removed, the bushing and springs 66 and 75 may be removed from the bolt 63 and with them the pinion 34. To assemble the clutch mechanism the procedure is reversed.

Similarly, the spool is easily removed from end plate 12, because the click mechanism assembly remains in the end plate. Thus, removal of the spool removes the pinion 50 and click wheel 53 on the spool shaft, but the gears 47 and 48 and the click pawl 54 and spring 58 remain in the end plate and are easily accessible.

The improved clutch and click mechanisms accordingly provide simple and compact constructions which are inexpensive to manufacture and assemble. Moreover, both mechanisms are mounted in the end plates of the reel and are easily disassembled therefrom for inspection, adjustment and repair.

What is claimed is:

1. In a fishing reel having end plates, a spool shaft journaled at its ends in said end plates, and a driving pinion in one end plate slidable on said shaft into and out of driving engagement with said shaft, clutch mechanism in said one plate including a yoke plate engaging said pinion, means for shifting said yoke plate axially of the shaft to engage and disengage the pinion from the shaft, said means including a bolt journaled in said one end plate, a lever for rotating the bolt, a transverse pin in the end of said bolt, a cam bushing axially slidable on said bolt and having a shoulder abutting said yoke plate, a spring around the bolt urging the yoke plate against said shoulder in a direction toward said pin, a second spring within the first urging said bushing against said pin, and a transverse cam slot in the end of said bushing for receiving the pin when the pinion is engaged with the spool shaft.

2. In a fishing reel having end plates, a spool shaft journaled at its ends in said end plates, and a driving pinion in one end plate slidable on said shaft into and out of driving engagement with said shaft, clutch mechanism in said one plate including a yoke plate engaging said pinion, means for shifting said yoke plate axially of the shaft to engage and disengage the pinion from the shaft, said means including a bolt journaled in said one end plate, a lever for rotating the bolt, a transverse pin in the end of said bolt, a cam bushing axially slidable on said bolt and having a shoulder abutting said yoke plate, a spring around the bolt urging the yoke plate against said shoulder in a direction toward said pin, a second spring within the first urging said bushing against said pin, a transverse cam slot in the end of said bushing for receiving the pin when the pinion is engaged with the spool shaft, and a shallower slot in the end of said bushing at right angles to said first slot for receiving the pin when the pinion is disengaged from the shaft.

3. In a fishing reel having end plates, a spool shaft journaled at its ends in said end plates, and a driving pinion in one end plate slidable on said shaft into and out of driving engagement with said shaft, clutch mechanism in said one plate including a yoke plate engaging said pinion, means for shifting said yoke plate axially of the shaft, said means including a bolt journaled in said one end plate, means for rotating the bolt, a transverse pin in the bolt, a cam bushing axially slidable on said bolt and movable within said yoke plate, a spring around the bolt urging the yoke plate toward said pin, a second spring within the first urging said bushing against said pin, and a transverse cam slot in the end of said bushing for receiving the pin when the pinion is engaged with the spool shaft.

References Cited in the file of this patent
UNITED STATES PATENTS

| 1,523,983 | Lauterbach | Jan. 20, 1925 |
| 1,639,629 | Case | Aug. 16, 1927 |
| 1,765,903 | Case | June 24, 1930 |
| 2,168,938 | Klein | Aug. 8, 1939 |
| 2,209,598 | Coxe | July 30, 1940 |
| 2,573,240 | Berlinger | Oct. 30, 1951 |